US012623170B2

(12) United States Patent
Shmidt et al.

(10) Patent No.: US 12,623,170 B2
(45) Date of Patent: May 12, 2026

(54) SORBENT COATED HOLLOW FIBER FILTRATION METHOD USING LESS SPENT SORBENT FLUSHING LIQUID

(71) Applicant: Electrophor Inc., Woodmere, NY (US)

(72) Inventors: Joseph L. Shmidt, Woodmere, NY (US); Evgeniya Sergeyevna Vasil'yeva, St. Petersburg (RU); Aleksandr Gennadievich Mitilineos, St. Petersburg (RU); Evgeniy Orekhov, Tallinn (EE); Anastasia Nikolaevna Vilkova, Leningrad region g. Gatchina (RU); Maria Anatol'evna Frolova, St. Petersburg (RU)

(73) Assignee: ELECTROPHOR, INC., Woodmere, NY (US)

( * ) Notice: Subject to any disclaimer, the term of this patent is extended or adjusted under 35 U.S.C. 154(b) by 0 days.

(21) Appl. No.: 17/280,556

(22) PCT Filed: Mar. 7, 2019

(86) PCT No.: PCT/RU2019/000309
§ 371 (c)(1),
(2) Date: Mar. 26, 2021

(87) PCT Pub. No.: WO2020/067921
PCT Pub. Date: Apr. 2, 2020

(65) Prior Publication Data
US 2022/0032218 A1 Feb. 3, 2022

(30) Foreign Application Priority Data

Sep. 27, 2018 (RU) ........................... RU2018134399

(51) Int. Cl.
| | |
|---|---|
| *B01D 37/02* | (2006.01) |
| *B01D 29/33* | (2006.01) |
| *B01D 29/66* | (2006.01) |

(52) U.S. Cl.
CPC ............. *B01D 37/02* (2013.01); *B01D 29/33* (2013.01); *B01D 29/66* (2013.01)

(58) Field of Classification Search
None
See application file for complete search history.

(56) References Cited

U.S. PATENT DOCUMENTS 2,083,578 A * 6/1937 Roberts ................ C10G 73/025
210/772
2,910,836 A 11/1959 Karrer
(Continued)

FOREIGN PATENT DOCUMENTS

| CN | 101732901 | 6/2010 |
|---|---|---|
| CN | 107108267 | 8/2017 |

(Continued)

OTHER PUBLICATIONS

International Report on Patentability in corresponding International Application No. PCT/RU2015/000216, mailed Jul. 8, 2015, 6 pages.

(Continued)

*Primary Examiner* — Robert J Popovics
(74) *Attorney, Agent, or Firm* — Fitch, Even, Tabin & Flannery LLP

(57) ABSTRACT

A liquid purification system includes a raw liquid supply line with a sorbent dispenser connected to an inlet of a filtration cartridge with a precoated layer of sorbent formed and removable by flushing and a purified liquid line connected to a purified liquid output of the filtration cartridge. The system is configured to decant spent sorbent and return most of the flushing liquid to the raw liquid supply line. A flushing liquid (Continued)

- - - - → direct flow
←——— back flushing flow and sorbent separation device is connected to a flushing liquid outlet of the filtration cartridge, and a clarified flushing liquid outlet of the flushing liquid and sorbent separation device is connected to the raw liquid supply line. The filtration cartridge is made as a hollow-fiber cartridge.

3 Claims, 2 Drawing Sheets

(56)　　　　　　　References Cited

U.S. PATENT DOCUMENTS

| | | | |
|---|---|---|---|
| 3,493,496 A | 2/1970 | Bray | |
| 3,674,146 A * | 7/1972 | Hoegger | B01J 20/28004 |
| | | | 210/195.3 |
| 3,794,172 A | 2/1974 | Bray | |
| 3,831,746 A * | 8/1974 | Wilson | B01D 37/02 |
| | | | 209/729 |
| 4,086,166 A | 4/1978 | Martin | |
| 4,089,781 A * | 5/1978 | Asp | B01D 29/52 |
| | | | 210/411 |
| 4,176,063 A | 11/1979 | Tyler | |
| 4,243,523 A | 1/1981 | Pelmulder | |
| 4,411,785 A * | 10/1983 | Yu | B01D 63/043 |
| | | | 210/497.1 |
| 4,414,113 A * | 11/1983 | LaTerra | B01D 63/024 |
| | | | 210/639 |
| 4,626,346 A | 12/1986 | Hall | |
| 4,704,210 A * | 11/1987 | Boze | B01D 35/12 |
| | | | 210/497.1 |
| 4,833,888 A | 5/1989 | Kerner | |
| 4,876,006 A * | 10/1989 | Ohkubo | B01D 65/02 |
| | | | 210/321.89 |
| 4,891,594 A | 1/1990 | Wilfley | |
| 4,921,610 A * | 5/1990 | Ford | B01D 61/145 |
| | | | 210/411 |
| 4,931,186 A * | 6/1990 | Ford | B01D 61/18 |
| | | | 210/636 |
| 4,935,143 A * | 6/1990 | Kopp | B01D 63/02 |
| | | | 210/636 |
| 4,973,404 A * | 11/1990 | Weber | B01D 37/02 |
| | | | 210/411 |
| 4,981,594 A | 1/1991 | Jones | |
| 4,983,301 A | 1/1991 | Laszlone | |
| 4,997,553 A | 3/1991 | Clack | |
| 5,024,762 A * | 6/1991 | Ford | B01D 69/02 |
| | | | 210/321.69 |
| 5,049,272 A | 9/1991 | Nieweg | |
| 5,092,990 A * | 3/1992 | Muramatsu | B01D 63/0241 |
| | | | 210/287 |
| 5,126,052 A * | 6/1992 | Lane | B01D 61/145 |
| | | | 210/639 |
| 5,244,585 A * | 9/1993 | Sugimoto | B01D 61/16 |
| | | | 210/791 |
| 5,266,203 A | 11/1993 | Mukhopadhyay | |
| 5,503,735 A | 4/1996 | Vinas | |
| 5,801,051 A * | 9/1998 | Kiefer | C12H 1/0408 |
| | | | 210/632 |
| 6,068,764 A | 5/2000 | Chau | |
| 6,093,312 A | 7/2000 | Boulter | |
| 6,103,125 A | 8/2000 | Kuepper | |
| 6,120,688 A * | 9/2000 | Daly | B01D 61/025 |
| | | | 210/636 |
| 6,162,361 A | 12/2000 | Adiga | |
| 6,190,558 B1 | 2/2001 | Robbins | |
| 6,290,856 B1 | 9/2001 | Beall | |
| 6,331,253 B1 * | 12/2001 | Schrive | B01D 61/027 |
| | | | 210/651 |
| 6,332,977 B1 * | 12/2001 | Janecek | B01D 37/02 |
| | | | 210/96.1 |
| 6,355,173 B1 * | 3/2002 | den Bieman | B01D 65/02 |
| | | | 210/636 |

| | | | |
|---|---|---|---|
| 6,555,014 B1 * | 4/2003 | Bremer | B01J 20/24 |
| | | | 210/406 |
| 6,890,436 B2 * | 5/2005 | Komatsu | B01D 67/0011 |
| | | | 264/45.9 |
| 6,986,847 B2 * | 1/2006 | Sirkar | C07K 1/34 |
| | | | 210/321.89 |
| 7,285,210 B2 | 10/2007 | Schmitt | |
| 7,338,595 B2 | 3/2008 | VanNewenhizen | |
| 7,601,256 B2 | 10/2009 | Beall | |
| 7,628,921 B2 | 12/2009 | Efraty | |
| 8,029,680 B2 * | 10/2011 | Shinoda | B01D 29/48 |
| | | | 210/777 |
| 8,147,700 B2 * | 4/2012 | Elektorowicz | C02F 3/1273 |
| | | | 210/243 |
| 8,309,711 B2 * | 11/2012 | Wiley | B01D 29/94 |
| | | | 210/411 |
| 8,652,331 B2 * | 2/2014 | Zha | B01D 65/02 |
| | | | 210/411 |
| 9,550,150 B2 | 1/2017 | Smirnov | |
| 10,399,870 B2 * | 9/2019 | Clark | C02F 1/281 |
| 10,562,787 B2 * | 2/2020 | Hoek | B01D 65/10 |
| 10,954,141 B2 * | 3/2021 | Wilson | C02F 1/008 |
| 11,439,955 B2 * | 9/2022 | Shmidt | B01D 61/027 |
| 11,717,775 B2 * | 8/2023 | Maiworm | A23D 9/04 |
| | | | 210/323.1 |
| 2002/0011443 A1 * | 1/2002 | Komatsu | B01D 67/003 |
| | | | 210/500.41 |
| 2002/0100716 A1 | 8/2002 | Bosko | |
| 2005/0023198 A1 | 2/2005 | Halemba | |
| 2005/0051502 A1 * | 3/2005 | Gottkehaskamp | B01D 29/74 |
| | | | 210/777 |
| 2005/0109703 A1 * | 5/2005 | Newenhizen | B01D 61/081 |
| | | | 210/257.2 |
| 2007/0062870 A1 * | 3/2007 | Chen | B01D 65/108 |
| | | | 210/636 |
| 2007/0151925 A1 | 7/2007 | De Los Reyes | |
| 2009/0113898 A1 | 5/2009 | Kirol | |
| 2009/0152197 A1 | 6/2009 | Lilas | |
| 2010/0018220 A1 | 1/2010 | Modad | |
| 2010/0300987 A1 * | 12/2010 | Shinoda | C02F 1/004 |
| | | | 210/777 |
| 2011/0031192 A1 * | 2/2011 | Wiley | B01D 29/52 |
| | | | 210/411 |
| 2011/0180465 A1 | 7/2011 | Richetti | |
| 2011/0198275 A1 | 8/2011 | Hayes | |
| 2011/0303660 A1 | 12/2011 | Yang | |
| 2012/0048790 A1 | 3/2012 | Voelker | |
| 2012/0055858 A1 * | 3/2012 | Collins | B01D 29/39 |
| | | | 210/121 |
| 2012/0168368 A1 | 7/2012 | De Los Reyes | |
| 2012/0234739 A1 | 9/2012 | Smirnov | |
| 2013/0334115 A1 | 12/2013 | Voelker | |
| 2014/0061129 A1 | 3/2014 | Hoz | |
| 2014/0110337 A1 | 4/2014 | Hoz | |
| 2016/0046503 A1 * | 2/2016 | Hoek | C02F 1/004 |
| | | | 210/741 |
| 2017/0209834 A1 * | 7/2017 | Cohen | B01D 65/02 |
| 2018/0251385 A1 * | 9/2018 | Clark | B01D 15/203 |
| 2020/0140286 A1 * | 5/2020 | Hoek | B01D 65/02 |
| 2020/0283309 A1 * | 9/2020 | Reid | B01D 71/024 |
| 2021/0245078 A1 * | 8/2021 | Maiworm | C11B 3/008 |
| 2022/0032218 A1 * | 2/2022 | Shmidt | B01J 20/18 |
| 2022/0220007 A1 * | 7/2022 | Reid | B01J 20/20 |
| 2023/0035831 A1 * | 2/2023 | Khadilkar | B01D 69/02 |

FOREIGN PATENT DOCUMENTS

| | | |
|---|---|---|
| CN | 107250063 | 10/2017 |
| CN | 108473341 | 8/2018 |
| CN | 108473342 | 8/2018 |
| DE | 102006015675 | 10/2007 |
| DE | 202011000680 | 9/2011 |
| DE | 16842406 | 11/2018 |
| DE | 16842407 | 11/2018 |
| EP | 0479492 | 4/1992 |
| EP | 1183212 | 3/2002 |
| EP | 3241807 | 11/2017 |

(56)　　References Cited

FOREIGN PATENT DOCUMENTS

| EP | 3345871 | | 7/2018 | | |
|----|---------|----|--------|------------|------------|
| EP | 3345872 | | 7/2018 | | |
| EP | 3372302 | A1 * | 9/2018 | .......... | B01D 15/203 |
| FR | 2940764 | | 7/2010 | | |
| RU | 2004233 | | 12/1993 | | |
| RU | 2047330 | | 11/1995 | | |
| RU | 2100295 | | 12/1997 | | |
| RU | 20256 | | 10/2001 | | |
| RU | 22434 | | 4/2002 | | |
| RU | 2199377 | | 2/2003 | | |
| RU | 2287490 | | 11/2006 | | |
| RU | 2297389 | | 4/2007 | | |
| RU | 2363663 | | 9/2007 | | |
| RU | 2006105261 | | 9/2007 | | |
| RU | 2331586 | | 11/2007 | | |
| RU | 2323036 | | 1/2008 | | |
| RU | 2006121054 | | 1/2008 | | |
| RU | 2323766 | | 5/2008 | | |
| RU | 74909 | | 7/2008 | | |
| RU | 89097 | | 11/2009 | | |
| RU | 2421270 | | 6/2011 | | |
| RU | 2473472 | | 1/2013 | | |
| RU | 2484884 | | 6/2013 | | |
| RU | 2494971 | | 10/2013 | | |
| RU | 2531392 | | 10/2014 | | |
| RU | 2614705 | | 3/2017 | | |
| RU | 2015137550 | | 3/2017 | | |
| SU | 1764094 | | 9/1992 | | |
| WO | 8502783 | | 7/1985 | | |
| WO | 9947226 | | 9/1999 | | |
| WO | 0076639 | | 12/2000 | | |
| WO | 02055182 | | 7/2002 | | |
| WO | 2002055182 | | 7/2002 | | |
| WO | 2010122336 | | 10/2010 | | |
| WO | 2011110585 | | 9/2011 | | |
| WO | 2012112045 | | 8/2012 | | |
| WO | 2015083717 | | 6/2015 | | |
| WO | 2015121821 | | 8/2015 | | |
| WO | 2016108733 | | 7/2016 | | |
| WO | 2017039485 | | 3/2017 | | |
| WO | WO-2017039485 | A1 * | 3/2017 | .......... | B01D 61/025 |

OTHER PUBLICATIONS

International Search Report for PCT/RU2015/000522 mailed Dec. 24, 2015, 2 pages.

International Search Report for PCT/HU2018/050036 mailed May 24, 2019; 3 pages.

International Search Report for PCT/RU2016/000464 mailed Jan. 19, 2017; 1 page.

International Search Report for PCT/RU2016/000466 mailed Jan. 12, 2017; 1 page.

International Search Report in corresponding International Application No. PCT/RU2015/000216, mailed Aug. 13, 2015, 3 pages.

Supplemental European Search Report and Written Opinion for EP15875786 dated May 16, 2018; 7 pages.

Written Opinion of the International Searching Authority for EP15807541 mailed Feb. 15, 2018; 5 pages.

Supplemental European Search Report for EP15807541 mailed Feb. 15, 2018; 2 pages.

Written Opinion of the International Searching Authority for PCT/RU2015/000216 mailed Aug. 13, 2015; 6 pages.

Written Opinion of the International Searching Authority for EP3214046 dated May 16, 2018; 5 pages.

Supplemental European Search Report for EP3214046 dated May 16, 2018; 2 pages.

International Report on Patentability in corresponding International Application No. PCT/RU2015/000890 mailed Jul. 18, 2017; 6 pages.

International Extended Search Report in International Application No. PCT/RU2015/000890 mailed May 25, 2018; 6 pages.

Provisional Opinion and Partial Search Report for EP3345871, dated Apr. 16, 2019; 11 pages.

International Prelminary Report on Patentability and Written Opinion of the International Search Authority for PCT/RU2016/000466 issued Mar. 6, 2018; 5 pages.

European Search Opinion for EP3345872, dated Mar. 29, 2019; 4 pages.

WO2015121821; EPO Machine Translation (Year: 2020).

FR2940764A 1—EPO Machine Translation (Year: 2020).

International Search Report for PCT/RU2019/000309 dated Aug. 13, 2019; 2 pages.

* cited by examiner

SORBENT COATED HOLLOW FIBER FILTRATION METHOD USING LESS SPENT SORBENT FLUSHING LIQUID

CROSS-REFERENCE TO RELATED APPLICATIONS

This application is the National Stage of International Application No. PCT/RU2019/000309, filed Mar. 7, 2019, which claims the benefit of Russian Patent Application No. 2018134399 filed Sep. 27, 2018.

TECHNICAL FIELD

The invention relates to liquid purification systems, which use filtration cartridge with precoat sorbent layer. Such systems are intended for purification or desalination of water from different sources, also of drinking water, technological solutions, wastewaters, beverages and other liquids of household or industrial.

BACKGROUND

Liquid purification systems, which use filtration cartridge with precoat sorbent layer and methods of stable purification precoat sorbent layer formation are known from the state of the art. It is known that formation of the sorbent layer on the filtration cartridge helps to extend operating age of cartridge or to increase liquid purification efficiency. At the same time the problem of used sorbent disposal is not solved yet. And that is the main lack of the inventions in the state of the art.

For example, liquid purification system of the U.S. Pat. No. 4,973,404 (IC B01D 37/02, priority 5 Sep. 1989, Aurian Corporation), chosen as the closest analogue, is known from the state of the art. System contains raw liquid supply line with sorbent dispenser and a pump, connected to the input of the purification cartridge. Purified liquid line is connected to the purified liquid output of the cartridge and drainage line is connected to the drainage output of the cartridge.

Liquid purification system of the U.S. Pat. No. 4,973,404 operates in three stages. First stage—precoat sorbent layer in filtration cartridge formation, second—liquid purification, third—filtration cartridge flushing. During the first stage sorbent suspension is pored into the dispenser, maximum pressure is set in the pump. Suspension flows into the purification cartridge, where precoat layer is formed.

On the second stage raw liquid is supplied through the raw liquid supply line to the input of the pump. Through the pump raw liquid is directed into purification cartridge, where precoat sorbent layer is already formed. There liquid purification takes place. Purified liquid goes to the consumer or into the storage vessel. Drainage liquid flows out of the system through drainage line, as there is no recirculation in the system.

On the third stage the pump is switched to the flushing mode and purified liquid flows into the purification cartridge. The liquid flow flushes used sorbent layer into drainage through drainage line.

The drawback of the system is that it is not effective in the ratio between used raw liquid and resulting purified liquid. Liquid loss occurs when drainage liquid is drawn out from the system during liquid purification stage and because purified liquid is used to flush the cartridge and after the flushing it is drawn into drainage too. Therefore, it is impossible to use the flushing liquid as well as the sorbent itself. In addition, the system cannot be used in the regions where wastewater disposal is totally forbidden, as the system cannot work without this stage.

SUMMARY

Object of the invention and the technical result achieved when using the invention is development of the new liquid purification system, increase of the raw liquid utilization rate at the decrease of the potential impact on the environment.

Problem to be solved and technical result are achieved by that a liquid purification system, comprising a raw liquid supply line with a sorbent dispenser connected to an inlet of a filtration cartridge with a precoated layer of sorbent formed and removable by flushing, a purified liquid line connected to a purified liquid output of the filtration cartridge, characterized in that the system is configured to decant spent sorbent and return most of the flushing liquid to the raw liquid supply line, wherein a flushing liquid and sorbent separation means is connected to a flushing liquid outlet of the filtration cartridge, and a clarified flushing liquid outlet of the flushing liquid and sorbent separation means is connected to the raw liquid supply line, and wherein the filtration cartridge is made as a hollow-fiber cartridge, and in that the sorbent is a regenerable or a non-regenerable sorbent, or a mixture of regenerable and non-regenerable sorbents.

DETAILED DESCRIPTION

Figure 1:
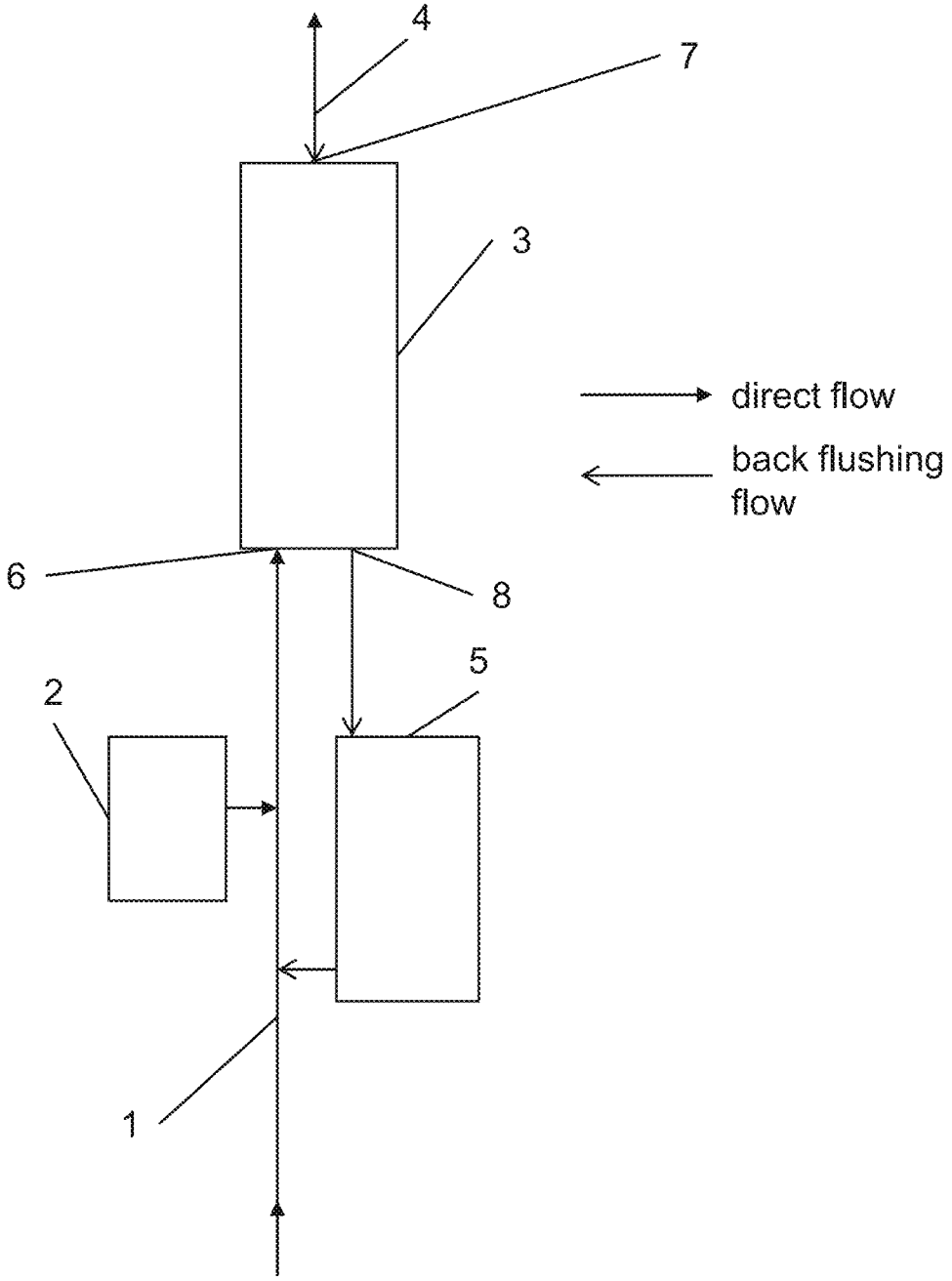
FIG. 1 shows liquid purification system.

Liquid purification system includes raw liquid supply line (1) with sorbent dispenser (2); filtration cartridge (3) connected to the system, purified liquid line (4) is connected to purified liquid outlet of the cartridge. Flushing liquid and sorbent separation means (5) and raw liquid supply line (1) are connected to inlet of filtration cartridge (3) the outlet of which is connected to raw liquid supply line (1).

Flushing liquid and sorbent separation means (5) and raw liquid supply line (1) are connected to filtration cartridge (3) inlet, the outlet of which is connected to raw liquid supply line (1).

Filtration cartridge (3) is made as ultra-micro-or nanofiltration hollow-fiber cartridge, connected to raw liquid supply line (1) so, that raw liquid flows into the fiber and purified liquid flows out through the pores, cartridge construction allows liquid to pass in opposite direction (from outside to inside) without mechanical damage of the cartridge, that is impossible for reverse osmosis cartridges, for example. The filtration cartridge (3) includes, an inlet (6), a filtrate or purified liquid outlet (7) and a flushing liquid outlet (8).

Sorbent dispenser (2) may be configured for example, but not limited to as, the vessel with the pump, suspension dispenser or dispensing means of RU 2614705 (priority 20 Apr. 2015, Applicant—Aquaphor Inc).

Additionally vessel for raw water and sorbent mixing (not depicted in the figures) maybe installed on raw liquid supply line (1).

Regenerable as well as none regenerable sorbents or their mixture can be used in the system. For example, but not limited to, ion exchange resin and/or ion exchange microfibers, zeolite can be used as regenerable sorbent. For example, but not limited to powdered activated carbon, perlite, diatomit, kizelgur can be used as regenerable sorbent Regenerable sorbents and their mixtures may be regenerated and used in the liquid purification system again. Particles diameter can vary from 10 nm to 500 mkm. When finely dispersed sorbents are used this increases flushed precoat layer stability, so it provides more fine liquid purification.

Figure 2:
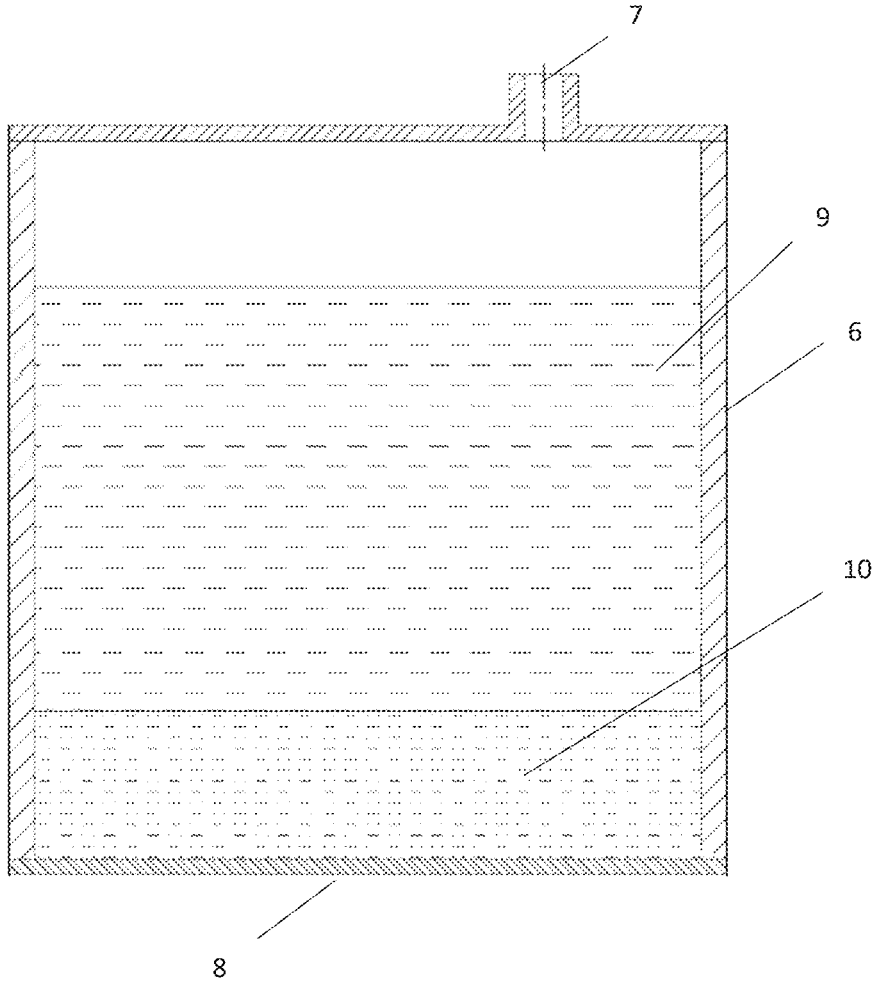
FIG. 2 shows an example flushing liquid and sorbent separation means.

Flushing liquid and sorbent separation means (5) includes, for example, vessel with fittings for liquid inlet and outlet. FIG. 2 illustrates one such example. Fitting for liquid inlet (7) is in the upper part of the vessel (6). Fitting for liquid outlet is in the lower part of the vessel. Vessel (6) can be made with dumping bottom (8) as illustrated in FIG. 2 or inner space of the vessel (6) can be divided by mechanical filter in two parts and one of them can be folded back. Or flushing liquid and sorbent separation means (5) can be made as a plunger teapot (french-press) where the flask is made of, for example, polymeric materials, ceramics, organic glass, shockproof glass. Flushing liquid is decanted from the sorbent's surface, and sorbent is damped from the flask (11) or is collected in the flask (11) and is disposed together with the flask (11), which is the exhaustible material. Flushing liquid and sorbent separation means (5) may be configured as vessel with cancellated or perforated bottom, which functions as mechanical filter. Flushing liquid (10) flows through the bottom and returns back to the raw liquid supply line (1), sorbent (9) remains in the vessel. Sorbent is collected in the vessel and may be damped from it or be disposed together with the vessel. Additionally vessel may have perforated or cancellated side walls. Also vessel may have compressed air supply means, for example, compressor, so it is equipped with airproof outer casing. Also vessel may be equipped with magnet or mechanical stirrer.

Additionally vessel for preliminary sorbent and raw liquid mixing (not given in the figures) may be installed on a raw liquid supply line (1).

Additionally vessel for purified liquid storage (not given in the figures) can be place on the purified liquid line (4).

Under the scope of distinguishing features claimed liquid purification system operates in two steps. On the first step liquid is purified and precoat sorbent layer is formed. On the second step—the sorbent is flushed and decanted and flushing liquid is returned back to the system.

On the first stage, raw liquid flows along the raw liquid supply line (1) in the form of direct flow (see corresponding bold arrows in FIG. 1) and is mixed in flow or in the vessel (not depicted in the figures) additionally installed on the raw liquid supply line (1) with the sorbent, coming from the sorbents dispenser (2), impurities are partly absorbed. Raw liquid and sorbent mixture flows into filtration cartridge (3), where raw liquid flows through pores of fibers and at the same time sorbent remains in the inners surface of the hollow fibers, forming precoat layer. Adsorption of impurities continues when raw liquid goes through hollow fibers. Purified liquid flows along purified liquid line (4) to a consumer or into the purified liquid storage vessel (not shown in the figures). Sorbent supply can take place only in the beginning of the filtration process or it can be constant or periodical during all filtration, the sorbents suspension flow velocity may be constant or may decrease as thickness of the sorbent layer in the inner walls of the hollow fibers increases. If the sorbents supply into raw liquid supply line (1) stops, liquid filtration through precoat sorbent layer of filtration cartridge (3) continues until sorption capacity is exhausted or until the flow resistance reaches its critical value, which defines as decrease of liquid flow velocity.

On the second stage, the flushing takes place. The flushing liquid may be purified liquid, raw liquid or their mixture. If purified liquid is used to flush the sorbent layer, then purified liquid through purified liquid line (4) goes backflow to the filtration cartridge (3) outlet (20), i.e. in the form of backflushing flow (see corresponding standard arrows in FIG. 1). As sorbent layer is formed only inside the fiber, so sorbent is flushed nearly almost. If raw liquid is used to flush the sorbents layer, then raw liquid supply line (1) is connected to outlet of the filtration cartridge (3), raw liquid along raw liquid supply line (1) goes into filtration cartridge (3) outlet (20) as said backflushing. If the mixture of raw and purified liquid is used, so two liquid flows together go to the filtration cartridge (3). Flushing liquid flowing through filtration cartridge (3) flushes sorbent layer making a mixture. This mixture of flushing liquid and sorbent through filtration cartridge (3) outlet (20) goes into the flushing liquid and sorbent separation means (5). Liquid separated from the sorbent after means (5) goes to raw liquid supply line (1) where it is mixed with raw liquid and then supplied together with it to filtration cartridge (3) inlet. So, there is no draining of liquid and sorbent mixture and liquid loss for flushing is significantly decreased and predominantly eliminated, as liquid returns back into the system.

To decant the sorbent in flushing liquid and sorbent separation means (5) sorbent can be stored, or flocculant or coagulant are added to quicken the sedimentation, or it can be filtrated through mechanical filter. If flocculant or coagulant is used the amount is estimated so that it reacts predominantly with all of the sorbent in the means (5). If small quantity of flocculant or coagulant remains in the flushing liquid and goes together with it into raw liquid, such quantity is filtrated through filtration cartridge (3), so none of reagents goes into purified liquid.

The predominately dewatered sorbent left in the flushing liquid and sorbent separation means (5) after flushing liquid and sorbent separation can be recovered. If regenerable sorbent was used it can be regenerated. The regeneration in this case is highly effective as the sorbent is concentrated, it is not watered with flushing liquid—only small amount of regenerating solution will be enough to recover it. After regeneration sorbent may be used in the liquid purification system again. When non-regenerable sorbent such as, for example, activated carbon was used it can be disposed.

Claimed liquid purification system is environmentally friendly and helps not only to decrease the concentration of impurities in wastewaters, but also to decrease their amount. Due to dewatering of the sorbent and its recycle, where only small amounts of reagents (if sorbent is regenerable) and liquid (if sorbent is non-regenerable) are used there is an opportunity to use powdered sorbents, which leads to increase of the liquid purification degree. Also return of flushing liquid into raw liquid supply line decrease wastewaters amounts and that increases ecological safety of the system.

The description of the present invention submits a preferred embodiment of the invention. It can be changed within the claimed set of the claims, so the wide use of the invention is possible.

The invention claimed is:

1. A method of purifying a liquid comprising the steps of:
  precoating a hollow-fiber filter in a hollow-fiber filter cartridge by:
    mixing a raw liquid stream which is to be filtered, with a sorbent dispensed from an inline sorbent dispenser (2), producing a mixed raw liquid/sorbent stream;

introducing the mixed raw liquid/sorbent stream into an inlet (6) of a hollow-fiber filtration cartridge (3);

flowing the introduced, mixed liquid/sorbent stream across the hollow-fibers contained within the hollow-fiber filtration cartridge, causing the sorbent to be removably deposited on exterior surfaces of the hollow fibers, while the raw liquid flows into an interior of the hollow fibers, producing a filtrate and a removable coating of sorbent on the exterior surfaces of the hollow fibers;

flowing the filtrate out of a purified liquid outlet (7) of the hollow fiber cartridge (3); and terminating the dispensing of sorbent to the raw liquid stream;

flowing the raw liquid stream through the inlet (6) of the hollow-fiber filtration cartridge (3), through the sorbent-coated hollow fibers, and a filtrate out through the purified liquid outlet (7);

terminating the flow of the raw liquid stream into the inlet (6);

removing spent sorbent from the surface of the fibers by introducing a flushing liquid into the hollow fiber filter cartridge causing a spent sorbent/flushing liquid mixture stream to flow out of the hollow-fiber filtration cartridge (3) through a flushing liquid outlet (8);

separating most of the flushing liquid from the spent sorbent/flushing liquid mixture stream by introducing the sorbent/flushing liquid mixture stream into a flushing liquid and sorbent separation means (5) producing a clarified flushing liquid stream and a deliquefied sorbent;

mixing the clarified flushing liquid stream with the raw liquid stream at a point upstream of the inline sorbent dispenser (2);

flowing the mixed clarified flushing liquid/raw liquid stream into the inlet (6) of the hollow-fiber filtration cartridge; and flowing filtrate out through the purified liquid outlet (7).

2. The method of purifying a liquid of claim 1, further comprising the step of:

regenerating any deliquefied sorbent that is capable of being regenerated.

3. The method of purifying a liquid of claim 1, further comprising the step of:

disposing of any deliquefied sorbent that is not capable of being regenerated.

\* \* \* \* \*